(12) United States Patent
Ohr et al.

(10) Patent No.: US 9,796,298 B2
(45) Date of Patent: Oct. 24, 2017

(54) WEDGE CLUTCH WITH STACKED WEDGE PLATES

(71) Applicant: Schaeffler Technologies AG & Co. KG, Herzogenaurach (DE)

(72) Inventors: Carsten Ohr, Charlotte, NC (US); Brian Lee, York, SC (US)

(73) Assignee: SCHAEFFLER TECHNOLOGIES AG & Co. KG, Herzogenaurach (DE)

( * ) Notice: Subject to any disclaimer, the term of this patent is extended or adjusted under 35 U.S.C. 154(b) by 127 days.

(21) Appl. No.: 14/872,617

(22) Filed: Oct. 1, 2015

(65) Prior Publication Data

US 2017/0097053 A1    Apr. 6, 2017

(51) Int. Cl.
| | |
|---|---|
| *F16D 41/063* | (2006.01) |
| *F16D 41/061* | (2006.01) |
| *F16D 15/00* | (2006.01) |
| *B60N 2/02* | (2006.01) |
| *F16D 41/066* | (2006.01) |
| *F16D 43/02* | (2006.01) |
| *F16D 13/16* | (2006.01) |
| *F16D 13/24* | (2006.01) |
| *F16D 13/06* | (2006.01) |

(52) U.S. Cl.
CPC ............ *B60N 2/02* (2013.01); *F16D 41/066* (2013.01); *F16D 43/02* (2013.01); *F16D 13/06* (2013.01); *F16D 13/16* (2013.01); *F16D 13/24* (2013.01); *F16D 15/00* (2013.01); *F16D 41/063* (2013.01)

(58) Field of Classification Search
CPC ...... F16D 41/061; F16D 41/063; F16D 13/14; F16D 13/16; F16D 13/24
See application file for complete search history.

(56) References Cited

U.S. PATENT DOCUMENTS

| | | | | |
|---|---|---|---|---|
| 9,429,199 | B2 * | 8/2016 | Ohr | F16D 13/14 |
| 2007/0045077 | A1 * | 3/2007 | Choi | F16D 25/0632 |
| | | | | 192/85.22 |
| 2014/0014455 | A1 * | 1/2014 | Davis | F16D 41/063 |
| | | | | 192/45.1 |
| 2014/0110207 | A1 * | 4/2014 | Davis | F16D 41/08 |
| | | | | 192/45.1 |
| 2015/0014113 | A1 * | 1/2015 | Ohr | F16D 13/14 |
| | | | | 192/70.23 |
| 2015/0083539 | A1 | 3/2015 | Lee et al. | |
| 2016/0091034 | A1 * | 3/2016 | Lee | F16D 23/12 |
| | | | | 192/35 |
| 2016/0238089 | A1 * | 8/2016 | Lee | F16D 43/00 |
| 2016/0238090 | A1 * | 8/2016 | Spencer | F16D 27/10 |

\* cited by examiner

*Primary Examiner* — Robert A Siconolfi
*Assistant Examiner* — Ryan Dodd

(57) ABSTRACT

A wedge clutch comprising an axis of rotation, a hub having a first radially outwardly facing surface sloping radially inward in a first axial direction, an outer race located radially outward of the hub and including, a first radially inwardly facing surface, and, a circumferential groove in the first radially inwardly facing surface, and, a first plurality of wedge plates radially disposed between the hub and outer race, each wedge plate in the first plurality of wedge plates including, a respective second radially inwardly facing surface directly engaged with the first radially outwardly facing surface, and, a respective second radially outwardly facing surface, wherein said each wedge plate has a different respective first radial dimension between the respective second radially inwardly and outwardly facing surfaces.

20 Claims, 6 Drawing Sheets

WEDGE CLUTCH WITH STACKED WEDGE PLATES

TECHNICAL FIELD

The present disclosure relates generally to a wedge clutch, and more particularly to a wedge clutch having a plurality of stacked wedge plates with different radial dimensions.

BACKGROUND

FIG. 6 is a cross-sectional view of prior art wedge clutch 200, in a free wheel mode. Wedge clutch 200 includes axis of rotation AR, hub 202, outer race 204, and single wedge plate 206. Hub 202 includes surface 208. Outer race 204 includes radially inwardly facing surface 210 and circumferential groove 212 in radially inwardly facing surface 210. It is desirable to produce wedge plate 206 by a stamping process and to maximize axial thickness 214 of the wedge plate. The axial thickness is maximized to reduce or prevent distortion of the wedge plate when the clutch is closed. For example, when clutch 200 is closed, the radially compressive force can cause wedge plate 206 to bow in axial direction AD1, lifting portion 206A of the wedge plate from surface 208 and breaking contact of portions of the wedge plate with surface 210. The reduction in contact between wedge plate 206 and the hub and/or outer race undesirably reduces the torque-carrying capacity of the clutch. However, it is difficult to produce a wedge plate having the desired thickness by the stamping process while maintaining the required tolerances for the wedge plate.

BRIEF SUMMARY

According to aspects illustrated herein, there is provided a wedge clutch, including: an axis of rotation; a hub having a first radially outwardly facing surface sloping radially inward in a first axial direction; an outer race located radially outward of the hub and including a first radially inwardly facing surface and a circumferential groove in the first radially inwardly facing surface; and a plurality of wedge plates radially disposed between the hub and outer race. Each wedge plate in the plurality of wedge plates includes: a respective second radially inwardly facing surface directly engaged with the first radially outwardly facing surface; and a respective second radially outwardly facing surface. Each wedge plate has a different respective first radial dimension between the respective second radially inwardly and outwardly facing surfaces. For a locked mode, the hub is displaceable in the first axial direction to displace the plurality of wedge plates radially outward to non-rotatably connect the outer race, the plurality of wedge plates and the hub. For a free wheel mode, the hub is displaceable in a second axial direction, opposite the first axial direction, to enable relative rotation between the hub and the outer race.

According to aspects illustrated herein, there is provided a wedge clutch, including: an axis of rotation; a hub having a first radially outwardly facing surface; an outer race located radially outward of the hub and including a first radially inwardly facing surface and a circumferential groove in the first radially inwardly facing surface; and a plurality of wedge plates radially disposed between the hub and outer race. Each wedge plate in the plurality of wedge plates includes: a respective second radially inwardly facing surface in contact with the first radially outwardly facing surface of the hub; and a respective second radially outwardly facing surface. For each wedge plate, the respective second radially inwardly facing surface is at a different respective radial distance from the axis of rotation. For a locked mode, the hub is displaceable in the first axial direction to displace the plurality of wedge plates radially outward to non-rotatably connect the outer race, the plurality of wedge plates and the hub. For a free wheel mode, the hub is displaceable in a second axial direction, opposite the first axial direction, to enable relative rotation between the hub and the outer race.

According to aspects illustrated herein, there is provided a wedge clutch, including: an axis of rotation; a hub having a first radially outwardly facing surface sloping radially inward in a first axial direction; an outer race located radially outward of the hub and including a first radially inwardly facing surface and a circumferential groove in the first radially inwardly facing surface; and a plurality of wedge plates radially disposed between the hub and outer race. Each wedge plate in the plurality of wedge plates includes a respective first corner in contact with the first radially outwardly facing surface and a respective second corner in contact with the first radially inwardly facing surface. For each wedge plate, the respective first corner is at a different respective radial distance from the axis of rotation. For a locked mode, the hub is displaceable in the first axial direction to displace the plurality of wedge plates radially outward to non-rotatably connect the outer race, the plurality of wedge plates and the hub. For a free wheel mode, the hub is displaceable in a second axial direction, opposite the first axial direction, to enable relative rotation between the hub and the outer race.

BRIEF DESCRIPTION OF THE DRAWINGS

The nature and mode of operation of the present disclosure will now be more fully described in the following detailed description of the present disclosure taken with the accompanying figures, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and, as such, may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the disclosure. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
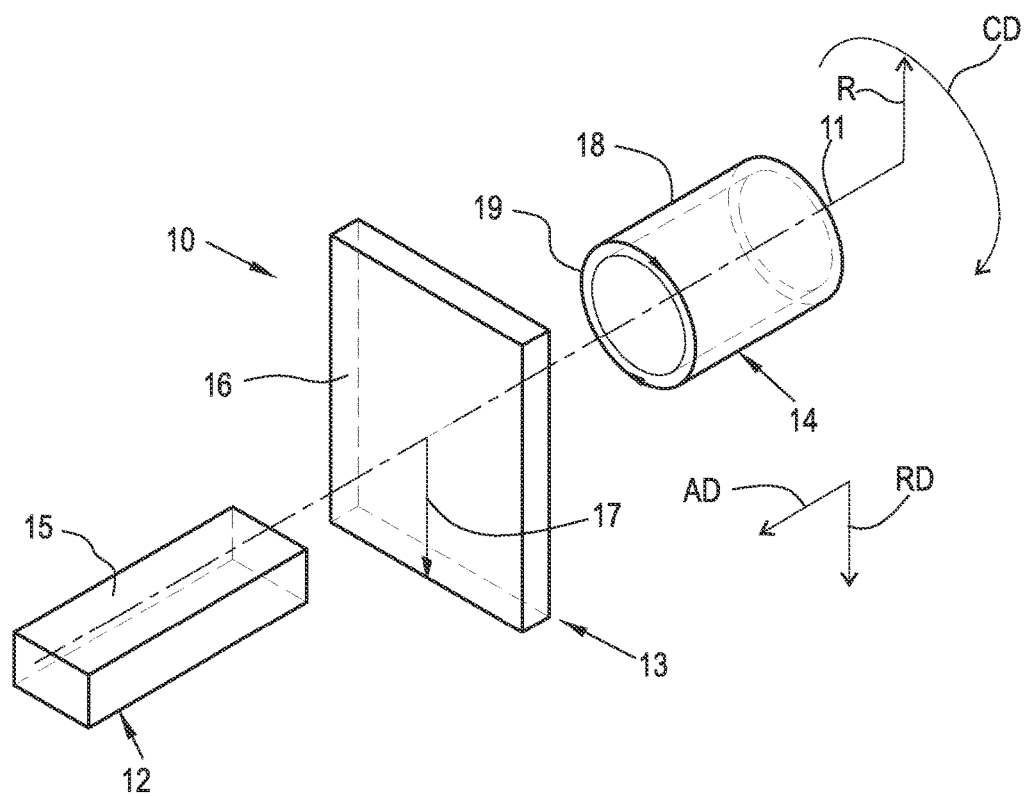
FIG. 1 is a perspective view of a cylindrical coordinate system demonstrating spatial terminology used herein.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
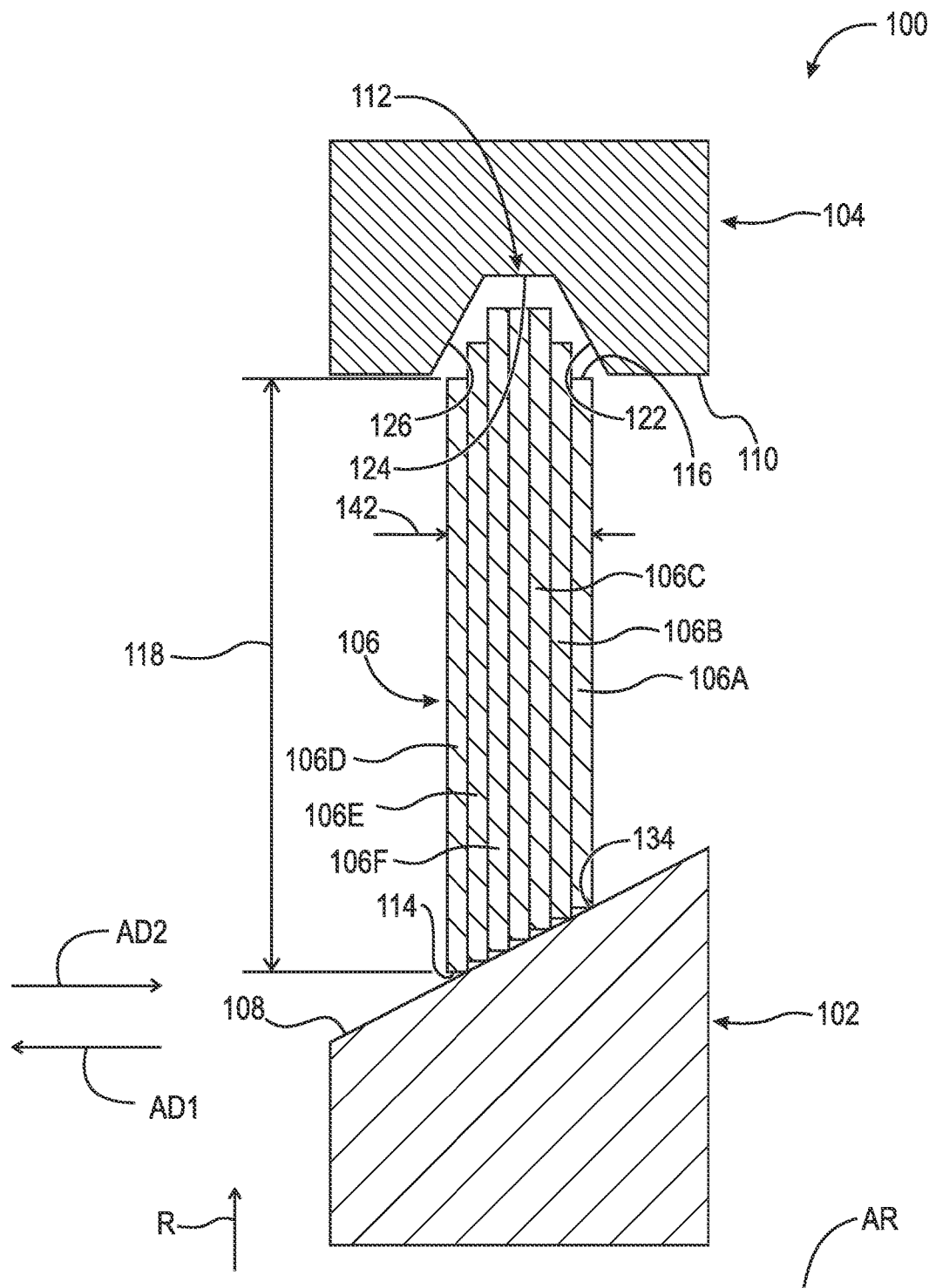
FIG. 2 is a cross-sectional view of a wedge clutch, with stacked wedge plates, in a free wheel mode.

FIG. 2 is a cross-sectional view of wedge clutch 100, with a plurality of wedge plates, in a free wheel mode. Wedge clutch 100 includes axis of rotation AR, hub 102, outer race 104, and wedge plates 106. Hub 102 includes radially outwardly facing surface 108 sloping radially inward in axial direction AD1. Outer race 104 is located radially outward of hub 102 and includes radially inwardly facing surface 110 and circumferential groove 112 in radially inwardly facing surface 110. Wedge plates 106 are radially disposed between hub 102 and outer race 104. Each wedge plate 106 includes: radially inwardly facing surface 114 directly engaged with radially outwardly facing surface 108; and radially outwardly facing surface 116. At least two of wedge plates 106 have a different radial dimension 118 between respective radially inwardly facing surface 110 and respective radially outwardly facing surface 108.

For a locked mode, hub 102 is displaceable in axial direction AD1 to displace wedge plates 106 radially outward to non-rotatably connect outer race 104, wedge plates 106, and hub 102. For a free wheel mode, hub 102 is displaceable in axial direction AD2, opposite axial direction AD1, to enable relative rotation between hub 102 and outer race 104. Wedge plates 106 are arranged to rotate with hub 102 due to frictional engagement between the wedge plates 106 and surface 108.

Figure 3:
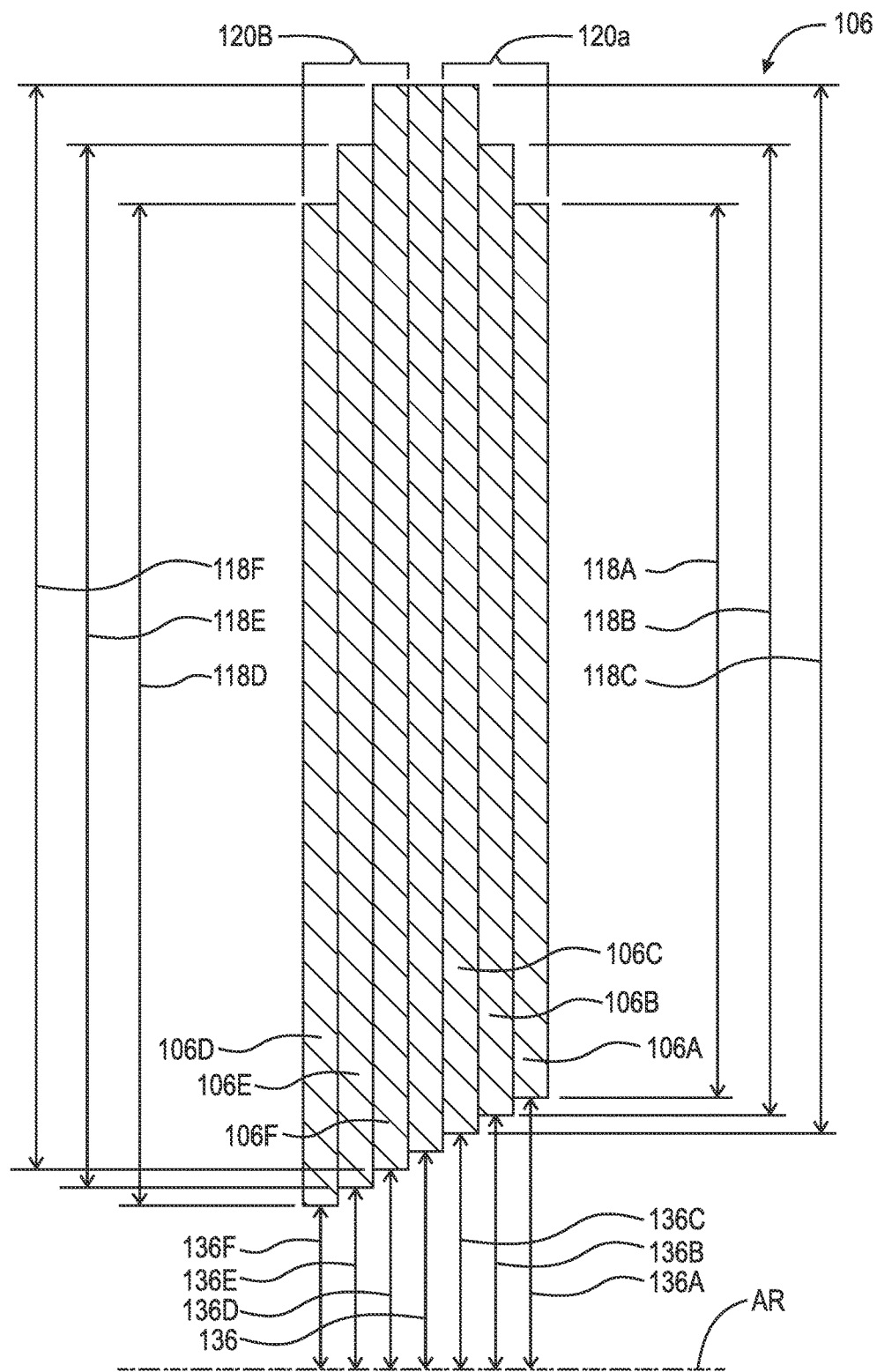
FIG. 3 is a detail of the wedge plates shown in FIG. 2.

FIG. 3 is a detail of the wedge plates shown in FIG. 2. In an example embodiment, sub-group, or plurality, 120A of wedge plates 106 includes wedge plates 106A, 106B, and 106C with radial dimensions 118A, 118B, and 118C, respectively, between radially inwardly facing surfaces 114 and radially outwardly facing surface 116. Dimension 118B is greater than dimension 118A and dimension 118C is greater than dimension 118B. Wedge plate 106B is axially disposed between wedge plate 106A and wedge plate 106C. It should be understood that more than one wedge plate 106 can have a same dimension 118. It also should be understood that wedge plates 106 can include individual wedge plates with other than three different dimensions 118.

Circumferential groove 112 includes surface 122 sloping radially outward in axial direction AD1; and surface 124 connected to surface 122 and parallel to axis of rotation AR. Wedge plates 106A and 106B are radially disposed between surface 122 and hub 102. Wedge plate 106C is radially disposed between surface 124 and the hub.

In an example embodiment, sub-group, or plurality, 120B of wedge plates 106 includes wedge plates 106D, 106E, and 106F with radial dimensions 118D, 118E, and 118F, respectively, between radially inwardly facing surfaces 114 and radially outwardly facing surface 116. Dimension 118E is greater than dimension 118D and dimension 118F is greater than dimension 118E. Wedge plate 106E is axially disposed between wedge plate 106D and wedge plate 106F. Circumferential groove 112 includes surface 126 sloping radially outward in axial direction AD2. Wedge plates 106D and 106E are radially disposed between surface 126 and surface 108. Wedge plate 106F is radially disposed between surface 124 and surface 108.

Figure 4:
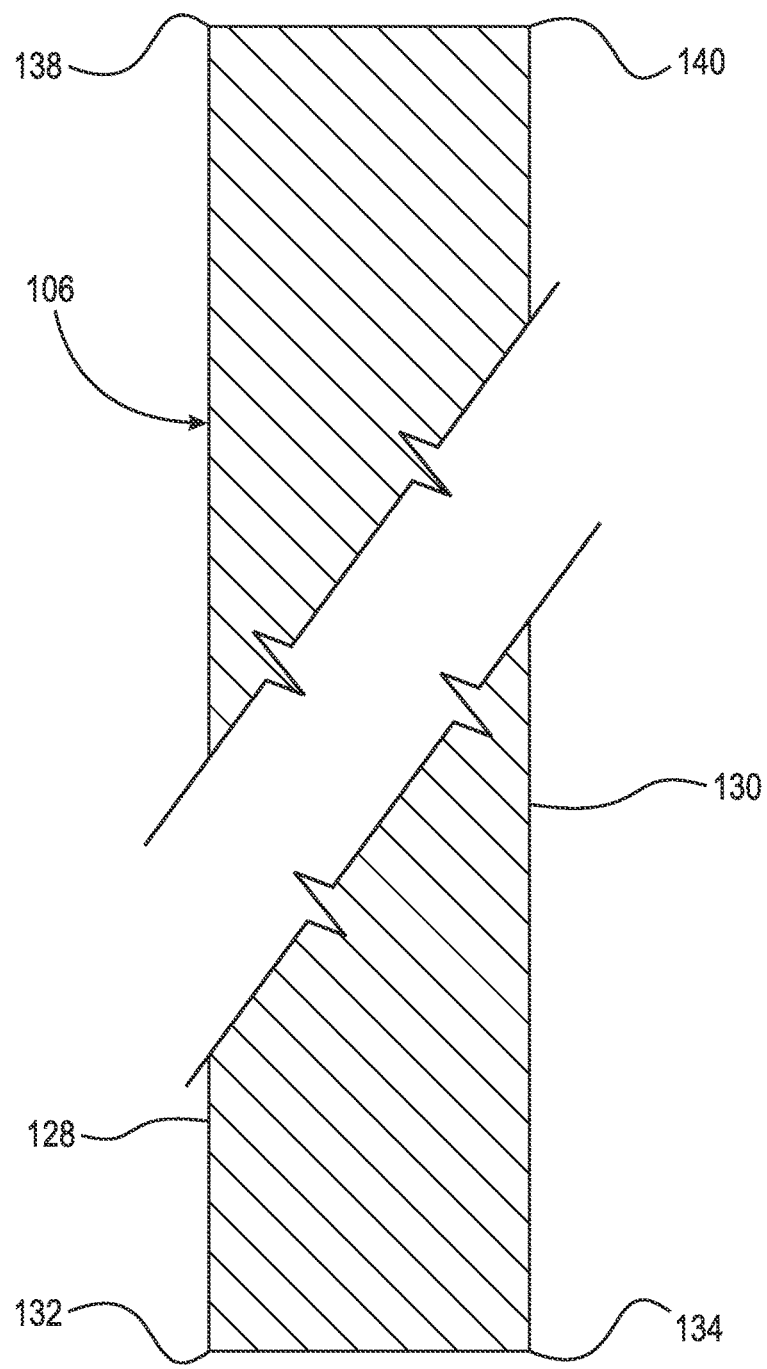
FIG. 4 is a detail of a wedge plate shown in FIG. 2.

FIG. 4 is a detail of a wedge plate shown in FIG. 2. Each wedge plate 106 includes: side surface 128 facing axial direction AD1; side surface 130 facing axial direction AD2; corner 132 connecting side surface 128 and surface 114; and corner 134 connecting side surface 130 and surface 114. Corner 132 is free of contact with surface 108, and corner 134 is in contact with surface 108.

In an example embodiment, each wedge plate 106 is at a different radial distance 136 from axis AR. Wedge plates 106A, 106B, and 106C are at radial distances 136A, 136B, and 136C, respectively, from axis AR. Distance 136B is less than dimension 136A and dimension 136C is less than dimension 136B. Wedge plates 106D, 106E, and 106F are at radial distances 136D, 136E, and 136F, respectively, from axis AR. Distance 136E is less than dimension 136D and dimension 136F is less than dimension 136E.

Each wedge plate includes: corner 138 connecting side 128 and surface 116; and corner 140 connecting side 130 and surface 116. As an example, for wedge plates 106A and 106B, corners 140 are in contact with surface 122 and for wedge plates 106E and 106F, corners 138 are in contact with surface 126.

Figure 5:
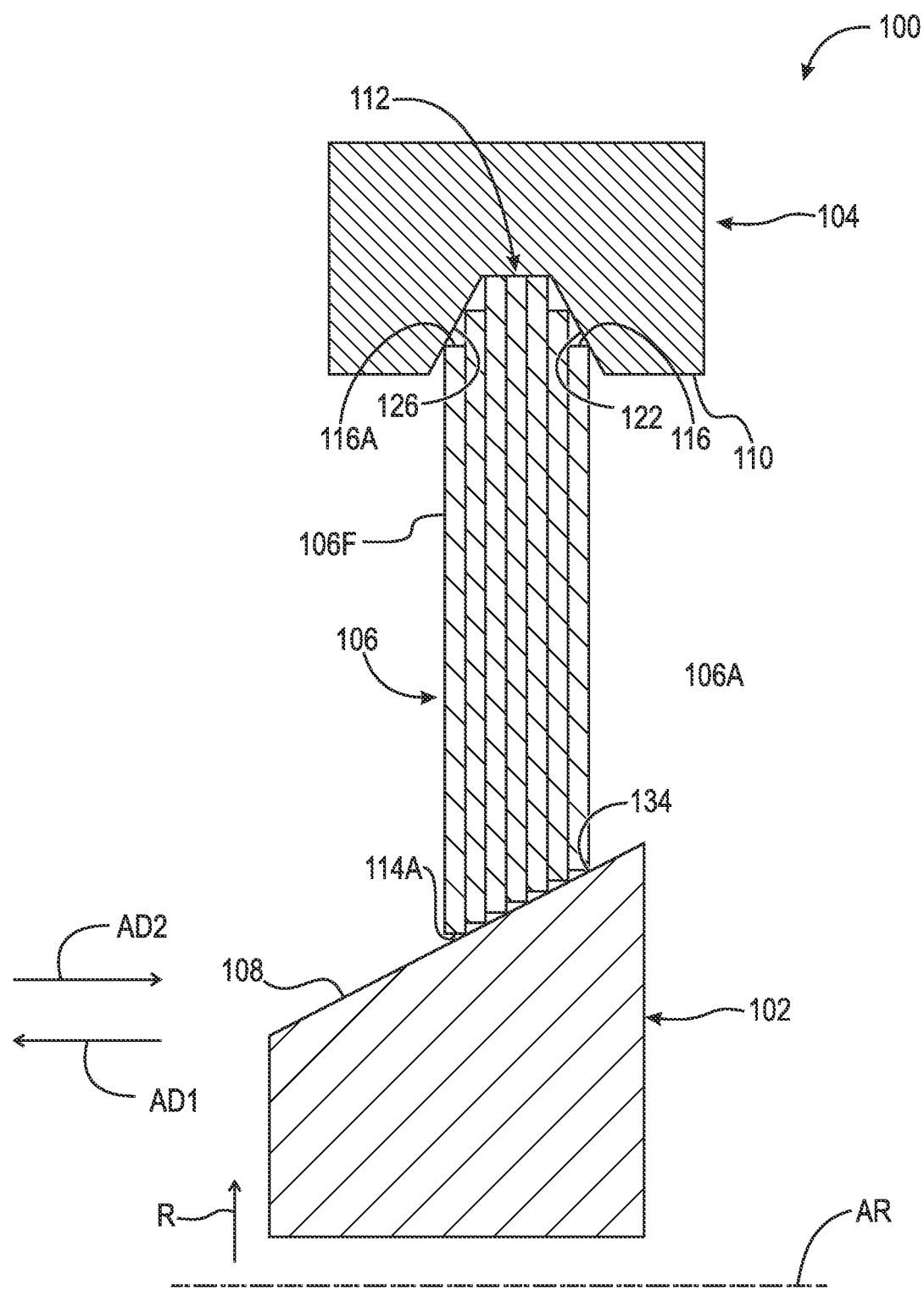
FIG. 5 is a cross-sectional view of the wedge clutch shown in FIG. 2 in a locked mode.
Figure 6:
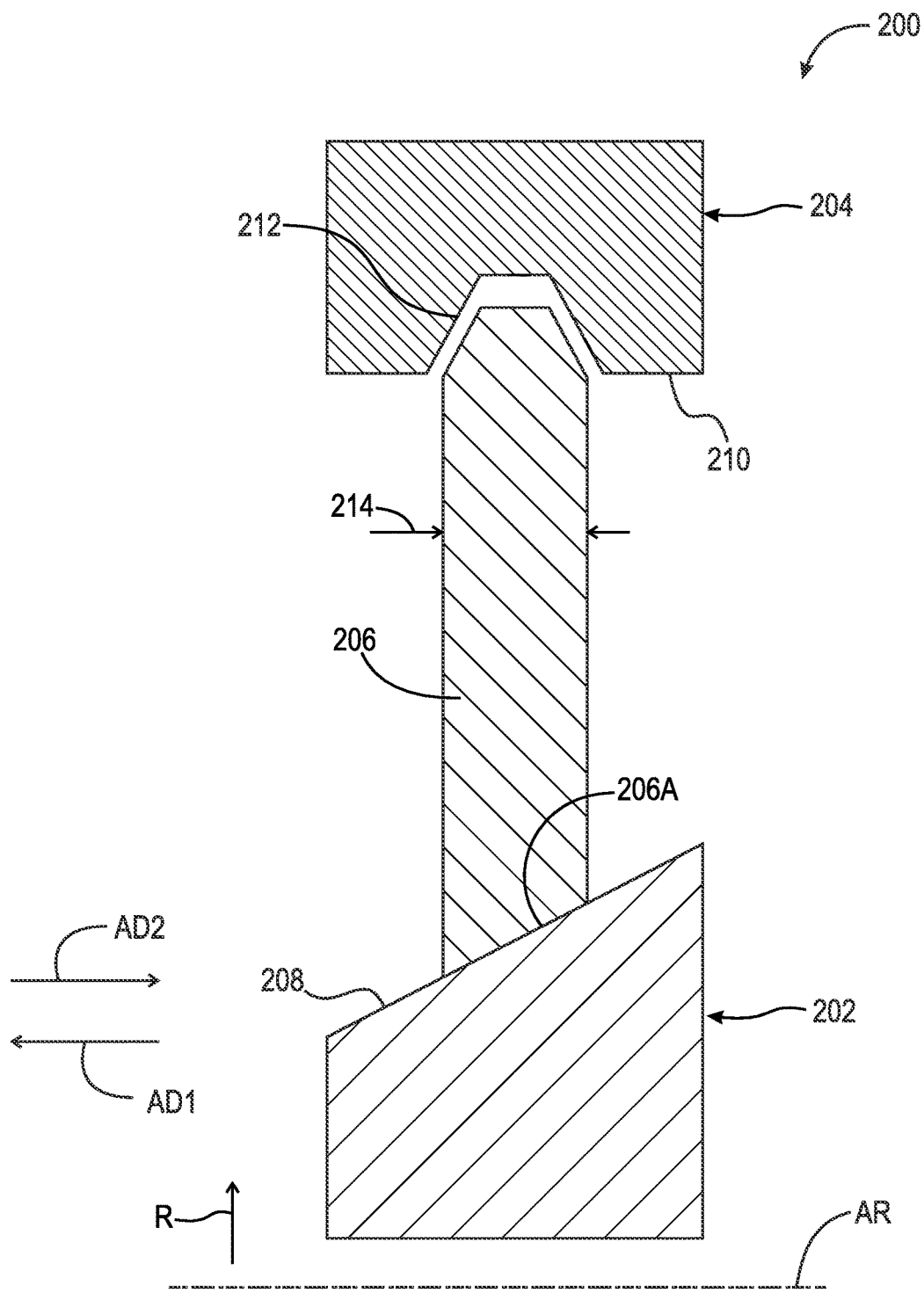
FIG. 6 is a cross sectional view of a prior art wedge clutch.

FIG. 5 is a cross-sectional view of the wedge clutch 100 shown in FIG. 2 in a locked mode. Hub 102 is displaceable in axial direction AD1. This displacement of hub 102 causes wedge plates 106 to displace in radial direction R. Wedge plates 106 are forced into the circumferential groove 112 within surface 110 to non-rotatably connect hub 102, race 104 and wedge plates 106. Advantageously, the various corners of wedge plates 106 increase the number of edges in contact with the hub or outer race in the closed mode. For sloped surfaces 108, 122, and 126, corners and edges associated with the corners have a greater frictional engagement force than flat surfaces. Further, assuming bowing of plates 106 in direction AD1 does occur, the edges remain in contact and the radially inner or outer surfaces connected to the corners will be brought into contact with the hub or the outer race, further increasing frictional engagement of wedge plates 106 with hub 102 and race 104. For example, if plate 106F bows in direction AD1, surface 114A is brought into contact with surface 108, and if plate 106F bows in direction AD2, surface 116A is brought into contact with surface 126. In like manner if plate 106A bows in direction AD1, surface 116 for plate 106A is brought into contact with surface 122.

In an example embodiment, wedge plates 106 are not fixedly connected to one another. In an example embodiment, wedge plates 106 are laser-welded together. In an example embodiment (not shown), wedge plates 106 are connected by fasteners, for example, are riveted together.

In an example embodiment, axial thickness 142 of plates 106 is about 5 mm. However, it should be understood that thickness 142 is not limited to 5 mm and that other thicknesses 142 are possible.

Advantageously, clutch 100 and in particular, wedge plates 106, resolve the problem noted above. First, axial thickness 142 of plates 106 is greater than can be attained for axial thickness 214 noted above for a stamped wedge plate while maintaining required tolerances. The required tolerances are easily attained for each individual wedge plate 106. Thus, increasing thickness 142 reduces the distortion of wedge plates 106 under load.

Second, as noted above, the plurality of corners and edges in contact with the hub or the outer race increase the frictional engagement between wedge plates 106 and hub 102 and race 104. Third, as noted above, even if distortion does occur, contact with the corners of wedge plates 106 is maintained and radially inner and/or outer surfaces of the wedge plates may be brought into contact with the hub and/or the outer race, respectively. All three of the advantages noted above add to the torque-carrying capacity of clutch 100.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A wedge clutch, comprising:
   an axis of rotation;
   a hub having a first radially outwardly facing surface sloping radially inward in a first axial direction;
   an outer race located radially outward of the hub and including:
      a first radially inwardly facing surface; and,
      a circumferential groove in the first radially inwardly facing surface; and,
   a plurality of wedge plates radially disposed between the hub and outer race, each wedge plate in the plurality of wedge plates including:
      a respective second radially inwardly facing surface directly engaged with the first radially outwardly facing surface; and,
      a respective second radially outwardly facing surface, wherein:
   said each wedge plate has a different respective radial dimension between the respective second radially inwardly facing surface and the respective second radially outwardly facing surface;
   for a locked mode, the hub is displaceable in the first axial direction to displace the plurality of wedge plates radially outwardly to non-rotatably connect the outer race, the plurality of wedge plates and the hub; and,
   for a free wheel mode, the hub is displaceable in a second axial direction, opposite the first axial direction, to enable relative rotation between the hub and the outer race.

2. The wedge clutch of claim 1, wherein:
   a first wedge plate in the plurality of wedge plates has a first radial dimension between the respective second radially inwardly facing surface and the respective second radially outwardly facing surface;
   a second wedge plate in the plurality of wedge plates has a second radial dimension between the respective second radially inwardly facing surface and the respective second radially outwardly facing surface, greater than the first radial dimension; and,
   a third wedge plate in the plurality of wedge plates has a third radial dimension between the respective second radially inwardly facing surface and the respective second radially outwardly facing surface, greater than the second radial dimension.

3. The wedge clutch of claim 2, wherein the second wedge plate is axially disposed between the first wedge plate and the third wedge plate.

4. The wedge clutch of claim 2, wherein:
   the circumferential groove includes:
      a first surface sloping radially outward in the first axial direction; and,
      a second surface connected to the first surface and parallel to the axis or rotation;
   the first and second wedge plates are radially disposed between the first surface and the hub; and,
   the third wedge plate is radially disposed between the second surface and the hub.

5. The wedge clutch of claim 2, wherein:
   the circumferential groove includes:
      a first surface sloping radially outward in the second axial direction; and,
      a second surface connected to the first surface and parallel to the axis or rotation;
   the first and second wedge plates are radially disposed between the first surface and the hub; and,
   the third wedge plate is radially disposed between the second surface and the hub.

6. The wedge clutch of claim 1, wherein said each wedge plate includes:
   a respective first side surface facing the second axial direction;
   a respective second side surface facing the first axial direction;
   a respective first corner:
      connecting the respective first side surface and the respective second radially inwardly facing surface; and,
      in contact with the hub; and,
   a respective second corner:
      connecting the respective second side surface and the respective second radially inwardly facing surface; and,
      free of contact with the hub.

7. The wedge clutch of claim 1, wherein:
   a first wedge plate in the plurality of wedge plates is at a first radial distance from the axis of rotation;

a second wedge plate in the plurality of wedge plates is at a second radial distance, greater than the first radial distance, from the axis of rotation; and,
a third wedge plate in the plurality of wedge plates is at a third radial distance, greater than the second radial distance, from the axis of rotation.

8. The wedge clutch of claim 7, wherein the second wedge plate is axially disposed between the first wedge plate and the third wedge plate.

9. The wedge clutch of claim 1 wherein respective wedge plates in the plurality of wedge plates:
are laser-welded together; or,
are riveted together; or,
are not fixedly connected to each other.

10. The wedge clutch of claim 1, wherein at least one wedge plate in the plurality of wedge plates includes:
a first side surface facing the second axial direction;
a second side surface facing the first axial direction;
a first corner:
   connecting the first side surface and the respective second radially outwardly facing surface; and,
   in contact with the outer race; and,
a second corner:
   connecting the second side surface and the respective second radially outwardly facing surface; and,
   free of contact with the outer race.

11. The wedge clutch of claim 1, wherein at least one wedge plate in the plurality of wedge plates includes:
a first side surface facing the first axial direction;
a second side surface facing the second axial direction;
a first corner:
   connecting the first side surface and the respective second radially outwardly facing surface; and,
   in contact with the outer race; and,
a second corner:
   connecting the second side surface and the respective second radially outwardly facing surface; and,
   free of contact with the outer race.

12. A wedge clutch, comprising:
an axis of rotation;
a hub having a first radially outwardly facing surface;
an outer race located radially outward of the hub and including:
   a first radially inwardly facing surface; and,
   a circumferential groove in the first radially inwardly facing surface; and,
a plurality of wedge plates radially disposed between the hub and outer race, each wedge plate in the plurality of wedge plates including:
   a respective second radially inwardly facing surface in contact with the first radially outwardly facing surface of the hub; and,
   a respective second radially outwardly facing surface, wherein:
for said each wedge plate, the respective second radially inwardly facing surface is at a different respective radial distance from the axis of rotation;
for a locked mode, the hub is displaceable in the first axial direction to displace the plurality of wedge plates radially outward to non-rotatably connect the outer race, the plurality of wedge plates and the hub; and,
for a free wheel mode, the hub is displaceable in a second axial direction, opposite the first axial direction, to enable relative rotation between the hub and the outer race.

13. The wedge clutch of claim 12, wherein:
a first wedge plate in the plurality of wedge plates is at a first radial distance from the axis of rotation;
a second wedge plate in the plurality of wedge plates is at a second radial distance from the axis of rotation, less than the first radial distance; and,
a third wedge plate in the plurality of wedge plates is at a third radial distance from the axis of rotation, less than the first radial distance.

14. The wedge clutch of claim 13, wherein the second wedge plate is axially disposed between the first wedge plate and the third wedge plate.

15. The wedge clutch of claim 13, wherein:
the circumferential groove includes:
   a first surface sloping radially outward in the second axial direction; and,
   a second surface connected to the first surface and parallel to the axis or rotation;
the second and third wedge plates are radially disposed between the first surface and the hub; and,
the first wedge plate is radially disposed between the second surface and the hub.

16. The wedge clutch of claim 13, wherein:
the circumferential groove includes:
   a first surface sloping radially outward in the first axial direction; and,
   a second surface connected to the first surface and parallel to the axis or rotation;
the first and second wedge plates are radially disposed between the first surface and the hub; and,
the third wedge plate is radially disposed between the second surface and the hub.

17. The wedge clutch of claim 12, wherein said each wedge plate includes:
a respective first side surface facing the second axial direction;
a respective second side surface facing the first axial direction;
a respective first corner:
   connecting the respective first side surface and the respective radially inwardly facing surface; and,
   in contact with the hub; and,
a respective second corner:
   connecting the respective second side surface and the respective radially inwardly facing surface; and,
   free of contact with the hub.

18. The wedge clutch of claim 12 wherein said each wedge plate has a different respective first radial dimension between the respective second radially inwardly facing surface and the respective second radially outwardly facing surface.

19. The wedge clutch of claim 18, wherein:
a first wedge plate in the plurality of wedge plates has a first radial dimension between the respective second radially inwardly facing surface and the respective second radially outwardly facing surface;
a second wedge plate in the plurality of wedge plates has a second radial dimension between the respective second radially inwardly facing surface and the respective second radially outwardly facing surface, greater than the first radial dimension; and,
a third wedge plate in the plurality of wedge plates is at a third radial dimension between the respective second radially inwardly facing surface and the respective second radially outwardly facing surface, greater than the second radial distance, from the axis of rotation.

20. A wedge clutch, comprising:
an axis of rotation;
a hub having a first radially outwardly facing surface sloping radially inward in a first axial direction;
an outer race located radially outward of the hub and including:
  a first radially inwardly facing surface; and,
  a circumferential groove in the first radially inwardly facing surface; and,
a plurality of wedge plates radially disposed between the hub and outer race, each wedge plate in the plurality of wedge plates including a respective first corner in contact with the first radially outwardly facing surface of the hub,
wherein:
  for said each wedge plate, the respective first corner is at a different respective radial distance from the axis of rotation;
  for a locked mode, the hub is displaceable in the first axial direction to displace the plurality of wedge plates radially outward to non-rotatably connect the outer race, the plurality of wedge plates and the hub; and,
  for a free wheel mode, the hub is displaceable in a second axial direction, opposite the first axial direction, to enable relative rotation between the hub and the outer race.

\* \* \* \* \*